(12) United States Patent
Yamamoto (10) Patent No.: US 8,165,905 B2
(45) Date of Patent: Apr. 24, 2012

(54) DATA PROCESSING UNIT, DATA PROCESSING METHOD, AND PROGRAM PRODUCT FOR DETERMINING A TRANSSHIPMENT METHOD

(75) Inventor: Masashi Yamamoto, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 1435 days.

(21) Appl. No.: 10/866,038

(22) Filed: Jun. 14, 2004

(65) Prior Publication Data
US 2005/0004849 A1 Jan. 6, 2005

(30) Foreign Application Priority Data

Jun. 13, 2003 (JP) .................................. 2003-169686
Jun. 2, 2004 (JP) .................................. 2004-164620

(51) Int. Cl.
*G06Q 10/00* (2006.01)
(52) U.S. Cl. ........................................... 705/7.12
(58) Field of Classification Search ................... 705/7.12
See application file for complete search history.

(56) References Cited

U.S. PATENT DOCUMENTS

| | | | | |
|---|---|---|---|---|
| 5,733,098 | A * | 3/1998 | Lyon et al. | 414/802 |
| 5,803,502 | A * | 9/1998 | Noll et al. | 283/79 |
| 5,809,489 | A * | 9/1998 | Davidor | 706/13 |
| 6,031,984 | A * | 2/2000 | Walser | 703/2 |
| 6,567,788 | B1 * | 5/2003 | Johnson, Jr. | 705/28 |
| 6,698,655 | B2 * | 3/2004 | Kondo et al. | 235/385 |
| 6,845,909 | B2 * | 1/2005 | Knowles et al. | 235/385 |
| 7,047,710 | B2 * | 5/2006 | Winkler | 53/540 |
| 7,426,484 | B2 * | 9/2008 | Joyce et al. | 705/28 |
| 2003/0171962 | A1 * | 9/2003 | Hirth et al. | 705/7 |
| 2004/0143465 | A1 * | 7/2004 | Imanishi | 705/6 |

OTHER PUBLICATIONS

Knut Alicke ("Modeling and optimization of the intermodal terminal Mega Hub," OR Spectrum (2002) 24: 1 17, Feb. 1, 2002).*
Andel, Tom ("Software Helps You Take Loads Off Your Fleet," Transportation and Distribution, Jul. 1991, pp. 39-44).*
Rebello, M.,; Julian, V.; Carrascosa, C.; Botti, V. ("A Multi-Agent system for the Automation of a Port Container Terminal," Autonomous Agents 2000 workshop on Agents in Industry, Barcelona, Spain, 2000).*
Staff Report ("Computers Get to the route of the Problem," Chilton's Distribution, May 1990, pp. 68-74).*
Pimpawat C. and N. Chaiyaratana ("Using a co-operative co-evolutionary genetic algorithm to solve a three dimensional container loading problem," Proceedings of the 2001 Congress on Evolutionary Computation, 2001, May 27-30, 2001).*

(Continued)

*Primary Examiner* — Romain Jeanty
*Assistant Examiner* — George H Walker
(74) *Attorney, Agent, or Firm* — Krtaz, Quintos & Hanson, LLP (57) ABSTRACT

A data processing unit, a data processing method, and a program product for determining a transhipment method are provided. The data processing unit may include a solution search processor for performing solution search processing of a plurality of physical objects. In the data processing unit, a data representation of a loading state of an object may have a corresponding variable which takes as a value an identification number of a heap at a predetermined physical location. The data representation of the loading state may include a coordinate value indicating a loading order of the object in the heap. The data processing unit may also include an initial condition inputter. The solution search processor may perform the solution search processing by constructing a search tree.

9 Claims, 7 Drawing Sheets

OTHER PUBLICATIONS

Photograph, Dortmund terminal, downloaded from PhotographersDirect.com on Jun. 26, 2010.*

Rebollo, M., Vicente, J., Carrascosa, C., Botti, V., 2001. "A MAS approach for port container terminal management." In: Third Iberoamerican Workshop on DAI-MAS, Atiaia, Sao Paulo, Brazil, pp. 83-94.*

Bontempi G., Gambardella L.M., Rizzoli A.E. "Simulation and Optimization for Management of Intermodal Terminals," European Simulation Multiconference 1997, Instanbul, Jun. 1-4, 1997.*

Steenken, Dirk; Voβ, Stefan; and Stahlbock, Robert. "Container terminal operation and operations research—a classification and literature review." OR Spectrum, vol. 26, No. 1, 3-49. Jan. 1, 2004, Springer Berlin / Heidelberg. SN 0171-6468. http://dx.doi.org/10.1007/s00291-003-0157-z. DO 10.1007/s00291-003-0157-z.*

A. E. Rizzoli, L. M. Gambardella, M. Zaffalon, and M. Mastrolilli, 1999, "Simulation for the Evaluation of Optimised Operations Policies in a Container Terminal" http://citeseerx.ist.psu.edu/viewdoc/summary?doi=?doi=10.1.1.42.7389 N1—CiteSeerX—Scientific Literature Digital Library and Search Engine [http://citeseerx.ist.psu.edu/oai2] (United S.*

P.A. Ioannou, E.B. Kosmatopoulos, K. Vukadinovic, Chin-I Liu, H.Pourmohammadi and Edmond Dougherty, Jr. "Real Time Testing and Verification of Loading and Unloading Algorithms Using Grid Rail (GR) Final Report." for the Center for Commercial Deployment of Transportation Technologies, University of Southern California, Center for Advanced Transporta.*

Hock Chan, Sen. "Dynamic AGV-Container Job Deployment Strategy." Master's Thesis, National University of Singapore, 2000.*

Hock Chan, Sen. "Dynamic AGV-Container Job Deployment Strategy." HPCES Programme, Singapore-MIT Alliance. 2002.*

Li, Chung-Lun; George L. Vairaktarakis. "Loading and unloading operations in container terminals." IIE Transactions. Institute of Industrial Engineers, Inc. (IIE). Apr. 1, 2004. Retrieved Mar. 4, 2011 from HighBeam Research.*

Gambardella, L. M.; Mastrolilli, M.; Rizzoli, A. E.; and Zaffalon, M. "An optimization methodology for intermodal terminal management," Journal of Intelligent Manufacturing, vol. 12, No. 5; 2001, SN 0956-5515, UL http://dx.doi.org/10.1023/A:1012208605758; DO 10.1023/A:1012208605758.*

Katta G. Murty, Jiyin Liu, Yat-Wah Wan, Chuqian Zhang, Maria C. L. Tsang, and Richard Linn. "DSS (Decision Support Systems) for Operations in a Container Shipping Terminal." Dec. 29, 2000.*

Knut Alicke ("Modeling and optimization of the intermodal terminal Mega Hub," OR Spectrum (2002) 24:1 17, Feb. 1, 2002).*

Rebollo, M., Vicente, J., Carrascosa, C., Botti, V., 2001. "A MAS approach for port container terminal management." In: Third Iberoamerican Workshop on DAI-MAS Atiaia, Sao Paulo, Brazil, pp. 83-94.*

Patent Abstracts of Japan, Publication No. 07064967 A, Mar. 10, 1995 * Abstract.

Patent Abstracts of Japan, Publication No. 06332908 A, Dec. 2, 1994 * Abstract.

Patent Abstracts of Japan, Publication No. 05173999 A, Jul. 13, 1993 * Abstract.

Patent Abstracts of Japan, Publication No. 05233597 A, Sep. 10, 1993 * Abstract.

Patent Abstracts of Japan, Publication No. 05028126 A, Feb. 5, 1993 * Abstract.

* cited by examiner

DATA PROCESSING UNIT, DATA PROCESSING METHOD, AND PROGRAM PRODUCT FOR DETERMINING A TRANSSHIPMENT METHOD

CROSS-REFERENCE TO RELATED APPLICATIONS

This application is based upon and claims the benefit of priority from the prior Japanese Patent Application Nos. 2003-169686, filed on Jun. 13, 2003 and 2004-164620, filed on Jun. 2, 2004, the entire contents of which are incorporated herein by reference.

BACKGROUND OF THE INVENTION

1. Field of the Invention

This invention relates to a technique applied to a constraint satisfaction problem, in which a value is allocated to a variable in order to satisfy a constraint condition.

2. Description of the Related Art

Conventionally, in investigating an appropriate transshipment method for steel products or the like at a steel plant, such a model as described below is conceived.

Three loading locations, namely, a location A, location B, and location C are envisaged as loading locations for a steel product or the like. The location A is a place where physical objects for transshipment (hereinafter simply referred to as "object") are initially loaded, while the location C is a final place for loading the objects. The location B is along a transfer path of the objects between the location A and location C, and is a place to transship the objects temporarily from the location A thereto, and transship the objects therefrom to the location C into a desired loading state.

As a specific example of such a model, from a warehouse 1 which is the location A, objects are transshipped and loaded on a truck (corresponding to the location B), and the loaded objects are transferred to the location C by the truck. Subsequently, in the location C, the objects are transshipped into a desired loading state.

Here, when heavyweight objects such as steel product is handled in particular, the following constraint conditions are placed in conceiving a transshipment method of the objects. One condition is that in the both cases where the objects are transshipped from the location A to the location B, and the objects are transshipped from the location B to the location C, the objects have to be taken out in an order beginning from an object loaded at an upper level in the original location, and another condition is that an object transferred earlier among the objects to be loaded in the same transshipping location has to be loaded at a lower level of the transshipping location.

Conventionally, a constraint satisfaction solution allowing a desired loading state in the location C is obtained by covering, as the solution search target, a solution space consisting of a set of solution candidates simulating transferring procedures of each object, and by detecting a solution candidate which satisfies the above constraint conditions.

[Patent Document 1] Japanese Patent No. 2951167
[Patent Document 2] Japanese Patent No. 3243058
[Patent Document 3] Japanese Patent Application Laid-open No. Hei 5-173999
[Patent Document 4] Japanese Patent Application Laid-open No. Hei 5-233597
[Patent Document 5] Japanese Patent Application Laid-open No. Hei 5-28126

However, conventionally, the enormity of the scale of the solution space targeted for solution search is seen as a problem. That is to say, the enormity of the scale of the solution space causes an extravagant processing time for the solution search processing in which a constraint satisfaction solution is searched out of the solution space, which is regarded as a serious problem.

SUMMARY OF THE INVENTION

The present invention is made in light of the above problem, and it is an object of the present invention to provide a data processing unit, data processing method, and program which can considerably reduce the size of a solution space compared to a prior one consisting of a set of solution candidates simulating object transferring orders, such that the solution search processing time is significantly shortened and the practical utility value of the processing is enhanced.

After dedicated investigations, the present inventor has attained embodiments as described below.

The data processing unit according to the present invention is characterized in having a solution search processor to perform solution search processing by having a variable for each object which takes as a value the identification number of a heap formed of one object or plural objects loaded in a predetermined location, and by allocating a value to the aforementioned variable.

The data processing method according to the present invention is a data processing method using a data processing unit, and characterized in performing solution search processing by allocating a value to a variable for each object which takes as the value the identification number of a heap formed of one object or plural objects loaded in a predetermined location.

The program according to the present invention is characterized in allowing a computer to execute the aforementioned data processing method.

DETAILED DESCRIPTION OF THE PREFERRED EMBODIMENTS

The following description relates to a preferable embodiment to which the present invention is applied, with reference to the drawings attached hereto.

First, a modeling example of a constraint satisfaction problem to which the present invention is applied is explained with reference to FIG. 1.

Figure 1:
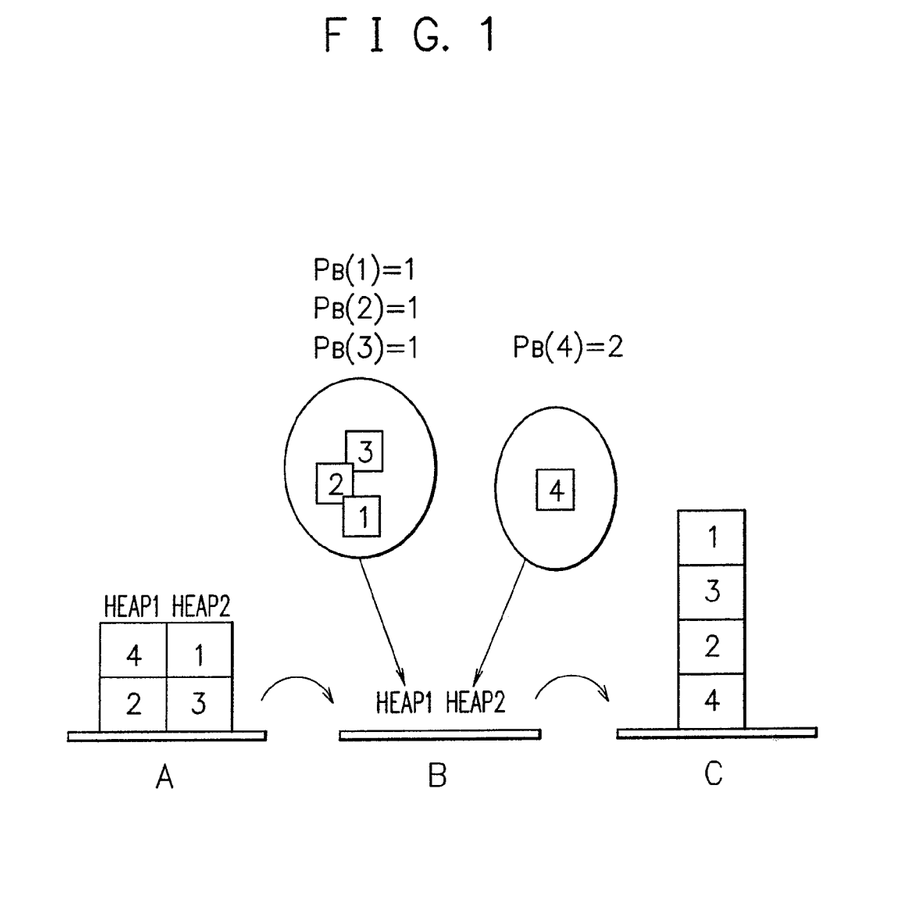
FIG. 1 is an explanatory diagram of an example of a modeling of a constraint satisfaction problem that applies the present invention.

FIG. 1 shows three loading locations of objects, which are a location A, a location B, and a location C. The constraint satisfaction problem applying the present invention which is dealt with is a problem to obtain a solution for: to which heap in the location B each object should be temporarily transshipped from the location A; and what is an order to transfer each object from the location A to the location B, and to transfer from the location B to the location C, such that the objects loaded in the location A can be eventually transshipped in a desired loading order in the location C.

In the example of FIG. 1, objects 1 to 4 are loaded on a heap 1 and a heap 2 in the location A. On the heap 1, the object 2 and object 4 are loaded in the order thereof from the lower level, while on the heap 2, the object 3 and object 1 are loaded in the order thereof from the lower level. Shown in the location C is a final loading state of the objects, in which, starting from the lower level, the object 4, object 2, object 3, and object 1 are loaded in the order thereof on a heap.

Note that here, the "heap" means a lump of objects formed of plural objects piled up as shown in FIG. 1, however, even a case of a single object structure is handled within the concept of "heap".

Further, terms used in the following descriptions, namely, "heap number variable", "transferring order variable", "solution", "partial solution", and "partial solution candidate" are defined as follows:
- heap number variable: a variable provided for each object, which takes as a value a heap number at a predetermined location upon transfer of each object to that location.
- transfer order variable: a variable provided for each object in respective cases of a transfer from a transfer origin to a predetermined location, and a transfer from the predetermined location to a transferring destination, which takes a transferring order of each object as a value.
- solution: a state in which all the existing variables are allocated with values, with each variable allocated with a value satisfying the constraint conditions.
- partial solution: a state in which a value is allocated to a heap number variable for a part or all of objects, with each variable allocated with a value satisfying the constraint condition.
- partial solution candidate: a state in which a value is allocated to a heap number variable for a part or all of objects, including a case in which each variable allocated with a value does not satisfy the constraint condition.

In the constraint satisfaction problem according to the present invention, a variable indicating a heap number in the location B for each of the objects 1 to 4 (heap number variable), a variable indicating a transferring order from the location A to the location B $S_{AB}(i) \in \{1, 2, 3, 4\}$, $i \in \{1, 2, 3, 4\}$ (transferring order variable), and a transferring order variable from the location B to location C $S_{BC}(i) \in \{1, 2, 3, 4\}$, $i \in \{1, 2, 3, 4\}$ are provided, and a solution search target is a set of partial solution candidates formed of a combination of patterns to allocate values to the heap number variables of each object 1 to 4. Among the partial solution candidates, the partial solution candidate satisfying the constraint condition referred to later is obtained as a partial solution. In the example of FIG. 1, the heap number variables of each object 1 to 4 takes a value of 1 or 2 respectively. Further, from each partial solution obtained as described above, a solution is obtained by allocating a value to a transferring order variable thereof.

In the description hereinafter, the loading state of an object i (i: 1, 2, 3, 4) in a location X (X: A, B, C), and the transshipping procedure (transfer procedure) of object i from the location X to a location Y (Y: B, C) are represented as follows:

$P_X(i)$: heap number of the object i in the location X
$H_X(i)$: loading order of the object i starting from lower level in the location X
$S_{XY}(i)$: transferring order of the object i from the location X to the location Y Accordingly, focusing on location A, the loading state of the object 1 is represented as:

$$P_A(1)=2 \quad \text{(formula 1)}$$

$$H_A(1)=2 \quad \text{(formula 2)}$$

The loading state of the object 2 is:

$$P_A(2)=1 \quad \text{(formula 3)}$$

$$H_A(2)=1 \quad \text{(formula 4)}$$

The loading state of object 3 is:

$$P_A(3)=2 \quad \text{(formula 5)}$$

$$H_A(3)=1 \quad \text{(formula 6)}$$

And the loading state of object 4 is:

$$P_A(4)=1 \quad \text{(formula 7)}$$

$$H_A(4)=2 \quad \text{(formula 8)}$$

Focusing on the location C, the loading state of the object 1 is represented as:

$$P_C(1)=1 \quad \text{(formula 9)}$$

$$H_C(1)=4 \quad \text{(formula 10)}$$

The loading state of the object 2 is:

$$P_C(2)=1 \quad \text{(formula 11)}$$

$$H_C(2)=2 \quad \text{(formula 12)}$$

The loading state of the object 3 is:

$$P_C(3)=1 \quad \text{(formula 13)}$$

$$H_C(3)=3 \quad \text{(formula 14)}$$

The loading state of the object 4 is:

$$P_C(4)=1 \quad \text{(formula 15)}$$

$$H_C(4)=1 \quad \text{(formula 16)}$$

The above representations are an initial condition given in advance with regard to the constraint satisfaction problem.

Further, the constraint condition is a condition satisfied by the solution, and in the present embodiment, the constraint condition derived from the above initial condition and the constraint condition derived from the partial solution candidate with constraint propagation are used to judge satisfaction of the constraints. It should be noted that the constraint conditions applicable to the present invention are not limited to the constraint conditions in the following descriptions, so that setting of an additional constraint condition which is appropriate according to a request of a user is included in the technical idea of the present invention.

Hereinafter, the constraint condition derived from the initial condition is explained. There are two types of constraint conditions which are derived from the initial condition, as follows:

<A constraint condition on the transferring order from the location A to the location B derived from the initial condition on the location A> When plural objects are loaded on the same heap in the location A, one among any two objects thereon i, j, which is loaded on an upper level has to be ahead in being moved out to the location B.

<A constraint condition on the transferring order of objects from the location B to the location C derived from the initial condition on the location C> When plural objects are loaded on the same heap in the location C, one among any two objects thereon i, j, which is going to be loaded on a lower level has to be ahead in being moved from the location B.

The above constraint conditions are represented by the following relational expressions:

<The constraint condition on the transferring order from the location A to the location B derived from the initial condition on the location A>
If $P_A(i)=P_A(j)$ and $H_A(i)>H_A(j)$, then $S_{AB}(i)<S_{AB}(i)$ <The constraint condition on the transferring order of objects from the location B to the location C derived from the initial condition on the location C>
If $P_C(i)=P_C(j)$ and $H_C(i)>H_C(J)$, then $S_{BC}(i)>S_{BC}(j)$ Incidentally, as to the relation between $P_C(i)$ and $P_C(j)$ in the present embodiment, for any two objects i, j, $P_C(i)=P_C(j)=1$ since the object i and object j are loaded on the same heap of objects in the location C without exception.

Accordingly, the constraint conditions in the example of FIG. 1 are as follows:
<The constraint condition on the transferring order from the location A to the location B derived from the initial condition on the location A>

$$S_{AB}(4)<S_{AB}(2) \quad \text{(formula 17)}$$

$$S_{AB}(1)<S_{AB}(3) \quad \text{(formula 18)}$$

<The constraint condition on the transferring order of objects from the location B to the location C derived from the initial condition on the location C>

$$S_{BC}(4)<S_{BC}(2) \quad \text{(formula 19)}$$

$$S_{BC}(4)<S_{BC}(3) \quad \text{(formula 20)}$$

$$S_{BC}(4)<S_{BC}(1) \quad \text{(formula 21)}$$

$$S_{BC}(2)<S_{BC}(3) \quad \text{(formula 22)}$$

$$S_{BC}(2)<S_{BC}(1) \quad \text{(formula 23)}$$

$$S_{BC}(3)<S_{BC}(1) \quad \text{(formula 24)}$$

Figure 2:
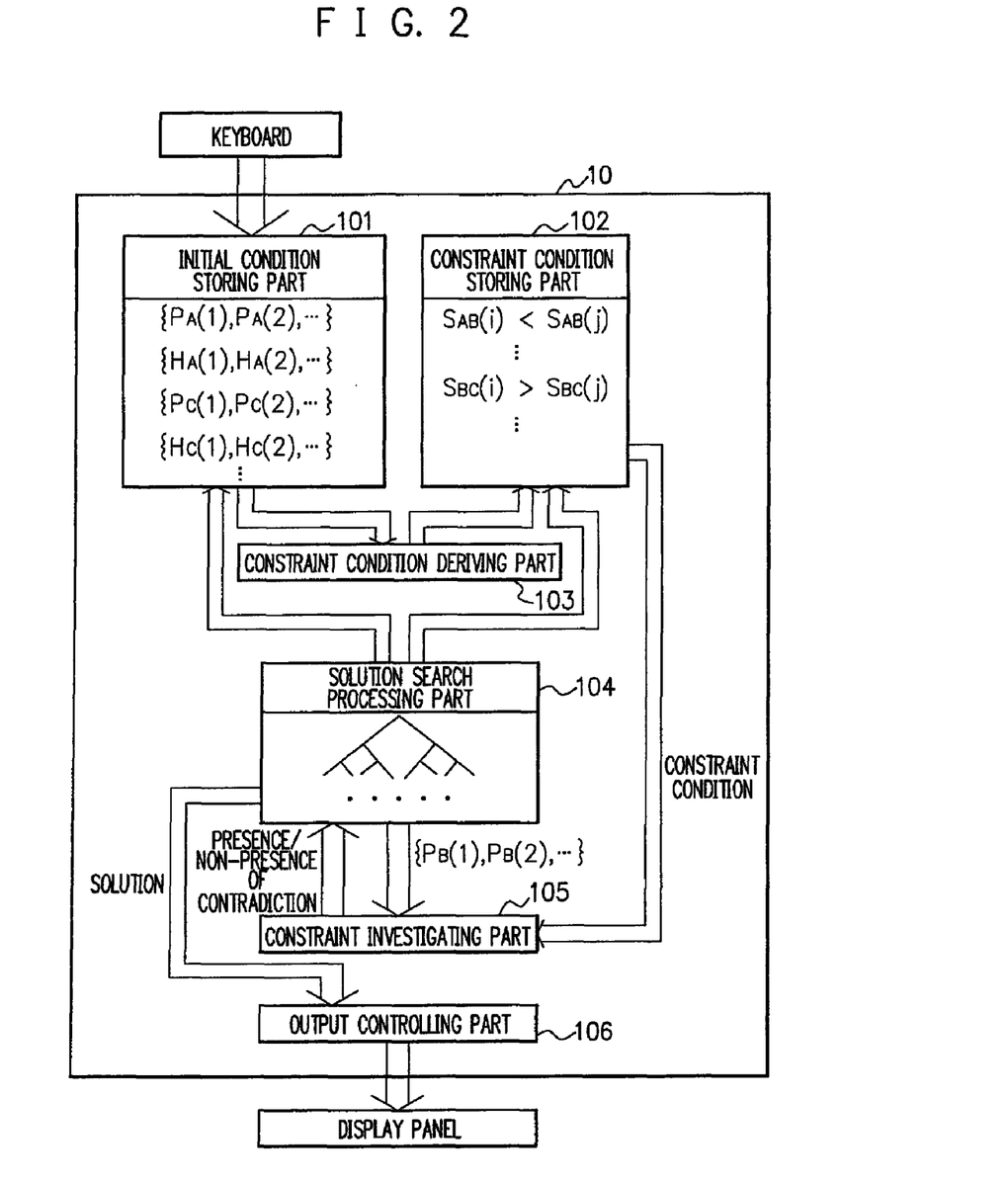
FIG. 2 is a block diagram showing a functional structure of a data processing unit according to an embodiment of the present invention.

FIG. 2 is a block diagram showing a functional structure of a data processing unit according to an embodiment of the present invention.

As shown in FIG. 2, a data processing unit 10 according to the present embodiment has a functional structure including an initial condition storing part 101, a constraint condition storing part 102, a constraint condition deriving part 103, a solution search processing part 104, a constraint investigating part 105, and an output controlling part 106.

The initial condition storing part 101 stores an initial condition inputted by an inputter such as a keyboard. An initial data herein referred to includes a data showing a loading state of objects in the location A and location C ($P_A$, $P_C$, $H_A$, $H_C$), as well as the number of heaps formable, the identification data, or the like on each heap in location B.

The constraint condition deriving part 103 derives a constraint condition on a transferring order of objects from the location A to the location B from the initial condition on the location A, and a constraint condition on a transferring order of objects from the location B to the location C from the initial condition on the location C, based on an initial condition stored in the initial condition storing part 101. The constraint condition storing part 102 stores the constraint condition derived by the constraint condition deriving part 103.

The solution search processing part 104 generates a partial solution candidate by allocating values to the heap number variables of the objects 1 to 4, based on identification data of objects (object number) given to each object, and the number of heaps in the location B, both being stored in the initial condition storing part 101, and delivers the partial solution candidate to the constraint investigating part 105.

The constraint condition deriving part 103 refers to the initial condition storing part 101, and derives a constraint condition (2) on $S_{AB}$, $S_{BC}$, based on the loading state of objects in the location A and the location B which is an initial condition, the partial solution candidate searched by the solution search processing part 104 and the following formulas 47 and 48.

$$(\forall i,j: i \neq j)((P_B(i)=P_B(j) \land S_{BC}(i)<S_{BC}(j)) \Rightarrow S_{AB}(i)>S_{AB}(j)) \quad \text{(formula 47)}$$

$$(\forall i,j: i \neq j)((P_B(i)=P_B(j) \land S_{AB}(i)<S_{AB}(j)) \Rightarrow S_{BC}(i)>S_{BC}(j)) \quad \text{(formula 48)}$$

Further, by examining a contradiction between the constraint condition (2) on $S_{AB}$, $S_{BC}$, and the constraint condition (1) on $S_{AB}$, $S_{BC}$, stored in the constraint condition storing part 102, the constraint investigating part 105 judges whether the partial solution candidate satisfies the constraints. Note that in the formula 47 and the formula 48, the anteroposterior relation of the transferring orders $S_{AB}$, $S_{BC}$, is inverse for the objects sharing the same heap number in a predetermined location.

The solution search processing part 104 regards the partial solution candidate as a partial solution when the partial solution candidate is judged to satisfy the constraints by the constraint investigating part 105. When the constraint investigating part 105 judges that the partial solution candidate does not satisfy the constraints, the solution search processing 104 backtracks, and continues solution search. The output controlling part 106 outputs the partial solution and the like by using an outputter such as a display panel. The output controlling part 106 is also capable of controlling a screen display to prompt a user to input each data on the above-described initial condition.

Figure 3:
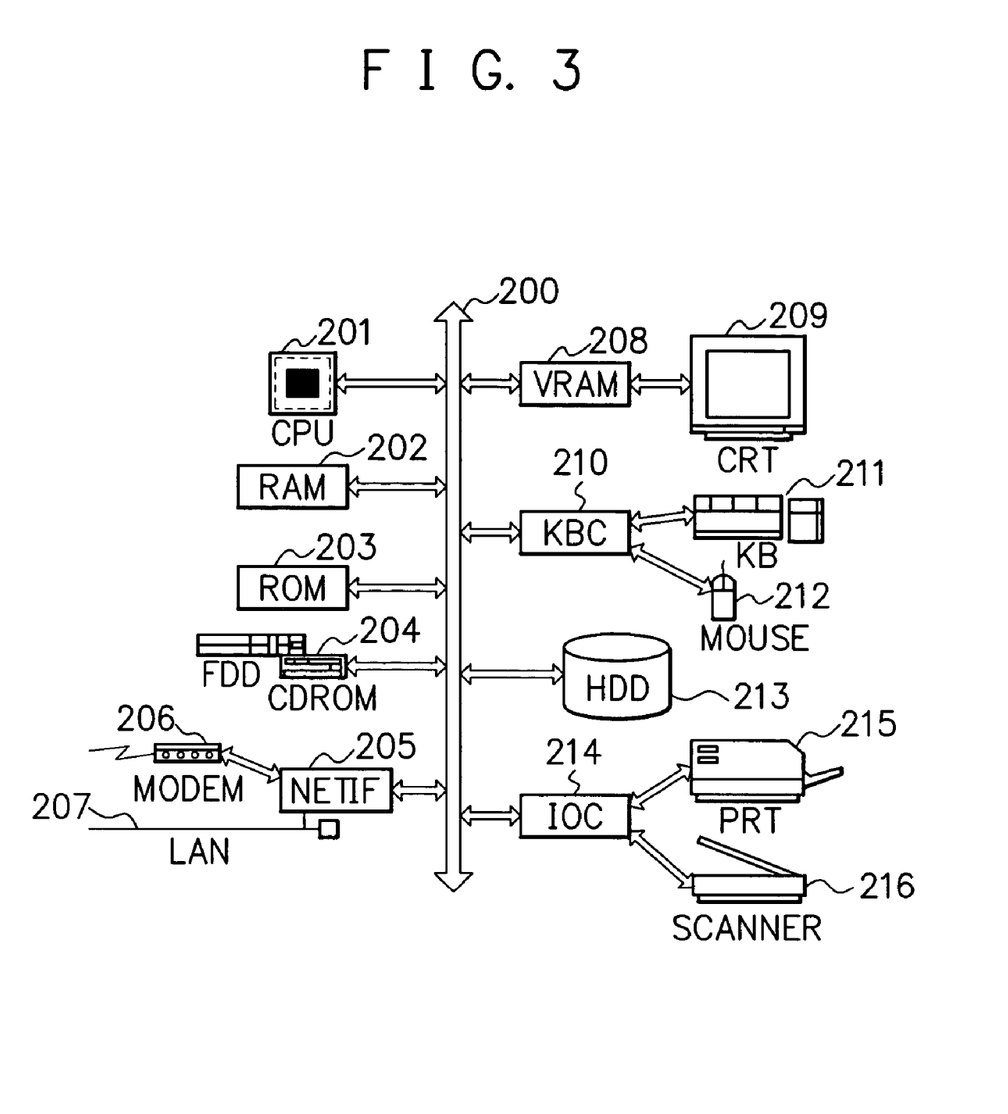
FIG. 3 is a diagram of a concrete example of a hardware structure of the data processing unit according to the embodiment of the present invention.

FIG. 3 shows a specific example of a hardware structure of the data processing unit according to the embodiment of the present invention. As shown in FIG. 3, the data processing unit according to the present invention can be applied to a PC (personal computer) and the like.

"200" represents a system bus which is a transmission path to transmit data among units, and to transmit control data. Each unit which is present in a case of the data processing unit is connected through the system bus 200. Hereinafter, each unit will be explained. A central processing unit (hereinafter called "CPU") 201 performs various controls and computations of the data processing unit, and has functions corresponding to the constraint condition deriving part 103, the solution search processing part 104, the constraint investigating part 105, and the output controlling part 106 in FIG. 2.

A random access memory (hereinafter referred to as "RAM") 202 functions as a main memory of the CPU 201, and as a storing region of an executing program, an execution area and data area of a program. Other than that, the RAM 202 has functions corresponding to the initial condition storing part 101 and the constraint condition storing part 102 in FIG. 1, as well as a function to temporarily retain a computation result of the constraint satisfaction solution investigating part 105. A read-only memory (hereinafter referred to as "ROM")

203 stores a basic program to control each unit in the data processing unit, namely BIOS (basic input/output system), and data necessary for the data processing unit to operate.

A group of units to input and output data (hereinafter referred simply to "FDD") 204 inputs and outputs data in a detachable external storage medium such as a flexible disk and a CD-ROM. A network interface (hereinafter referred simply to as "NETIF") 205 connects to an external network through a modem 206 described below, or connects to a LAN 207 described below. The NETIF 205 judges controlling and connecting states to transfer data between data processing units through a network.

The modem 206 is a device to connect an external network with the data processing unit through a telephone circuit, and includes a modem and a terminal adapter for connecting to ISDN. The LAN 207 is a network system such as an Ethernet (R). The data processing unit according to the present embodiment connects to the external network by using a telecommunication device such as a router, gateway, or the like connected on the modem 206 or the LAN 207, such that transmission and reception of data with an external device comes to be possible.

A video RAM (hereinafter referred to as "VRAM") 208 holds an image data operated to be displayed on a CRT 209 described below. The CRT 209 is a displaying device such as a display.

A keyboard controller (KBC) 210 controls an input signal from a keyboard (KB) 211 and a mouse 212. The KB 211 is a keyboard for a user of the data processing unit 10 to perform an inputting operation. The mouse 212 is a pointing device for the user of the data processing unit 10 to perform an inputting operation.

A hard disk drive (HDD) 213 is used for storage of an application program and various data. The initial condition storing part 101 and the constraint condition storing part 102 of FIG. 2 may be included in the hard disk drive 213. The application program is a software program to allow the data processing unit to execute a processing shown in the flowchart of FIG. 4, for example. A structure in which the data processing unit obtains an application program through a data transmission medium such as an external network, a data storage medium such as a CD ROM, and the like, is included in the category of the technical idea of the present invention.

A controller (IOC) 214 enables input/output controlling of data with respect to a printer (PRT) 215, a scanner 216, and so forth which are externally connected. Further, although not shown in the drawing, it is possible for the IOC 214 to control input/output of data, for example, with respect to a HDD, MO drive, and the like which are also externally connected other than the printer 215 and the scanner 216.

Figure 4:
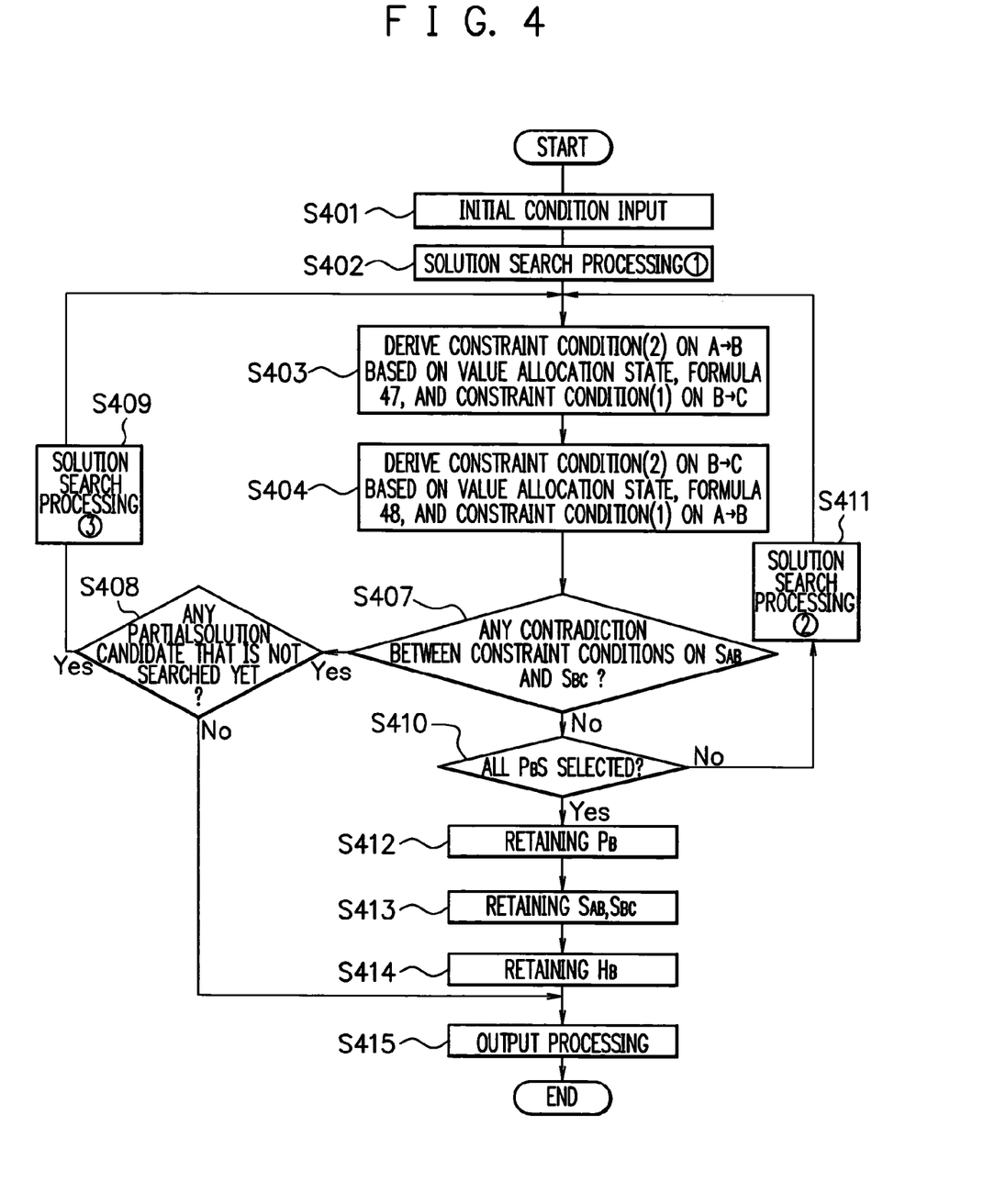
FIG. 4 is a flowchart showing an operational flow of the data processing unit according to the embodiment of the present invention.

Next, a detailed explanation is given on operations of the data processing unit 10 according to the present embodiment with reference to the flowchart of FIG. 4. The explanation continues to be based on the constraint satisfaction problem in FIG. 1.

First, the user inputs an initial condition using the KB 211 or the mouse 212 (step S401). Here, the initial condition to be inputted includes the loading state of an object in the location A and the desired loading state of the object in the location C (the formulas 1 to 16), as well as the number of heaps formable (here, two heaps) in the location B, and so forth.

The initial condition storing part 101 stores an initial condition which is inputted. Subsequently, the constraint condition deriving part 103 reads out the initial condition stored in the initial condition storing part 101, and based on the initial condition, derives the constraint condition (1) (the formulas 17 to 24) on $S_{AB}$, $S_{BC}$.

The constraint condition storing part 102 stores the derived constraint condition (1) on $S_{AB}$, $S_{BC}$. Subsequently, the solution search processing part 104 determines, by referring to data showing "the number of heaps formable in the location B being two" stored in the initial condition storing part 101, that the objects 1 to 4 can be transshipped to the heap 1 or heap 2 respectively in the location B, and executes solution search using a branch-and-bound technique by updating the combination of values for variables indicating the heap numbers in the location B (step S402). Incidentally, if an identification data on the heaps are inputted as an initial condition, the solution search processing part 104 may judge from the identification data that the objects 1 to 4 are transshippable to the heap 1 or 2 respectively in the location B.

Figure 5:
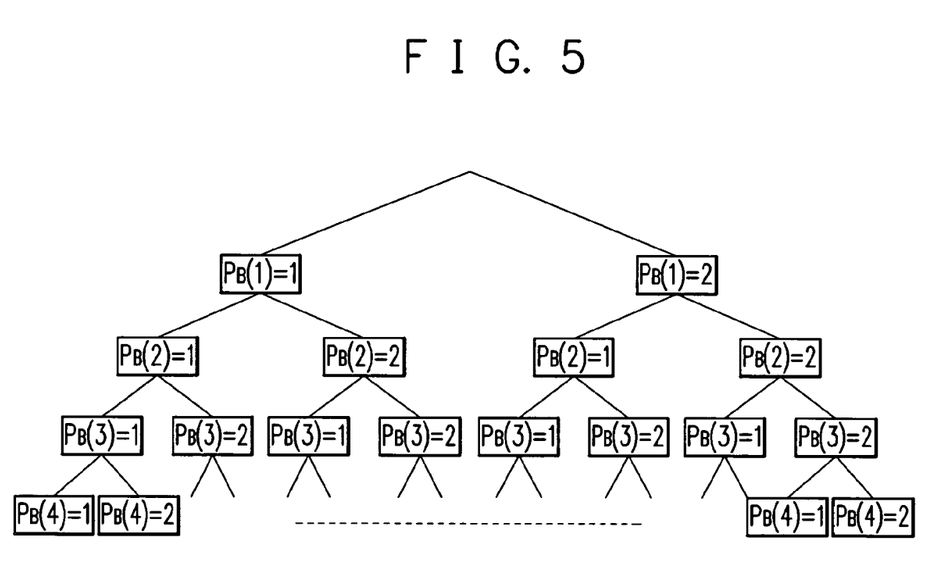
FIG. 5 is a schematic view of a solution space targeted for solution search according to the embodiment of the present invention.

FIG. 5 is a schematic diagram of the solution space targeted for the solution search of the present invention. The solution space is also called a search tree. The solution search process by the branch-and-bound technique of the present embodiment commences solution search from the leftmost branch of the solution space in the diagram. The solution search processing part 104 selects objects each by each, and selects a value of $P_B$ for a selected object. Here, selection is performed as $P_B(1)=P_B(2)=1$.

Subsequently, the constraint condition deriving part 103 derives a constraint condition (2) for $S_{AB}$ as shown below based on a search solution result of the solution search processing part 104 ($P_B(1)=P_B(2)=1$), and the initial condition formula 23 and a formula 47 on the location C (step S403).

$$S_{AB}(1) < S_{AB}(2) \tag{formula 26}$$

Similarly, the constraint condition deriving part 103 derives a constraint condition (2) for $S_{BC}$ based on a search solution result at the solution search processing part 104 ($P_B(1)=P_B(2)=1$), and the initial condition and a formula 48 on the location A (step S404). However, since a loading condition of objects 1, 2 in the location A is $P_A(1) \neq P_A(2)$, there is no constraint condition for the loading state in the location B to be $P_B(1)=P_B(2)=1$. Accordingly, a constraint condition is not derived here.

Subsequently, it is judged whether there is any contradiction between the constraint condition (1) on $S_{AB}$ (formulas 17 to 18) and the constraint condition (2) on $S_{AB}$ (formula 26), and between the constraint condition (1) on $S_{BC}$ (formula 19 to formula 24) and the constraint condition (2) (no constraint condition in the case hereof)(step S407). That is to say, in judging presence of a contradiction between the formulas 17 to 18 and the formula 26 which are the constraint conditions on $S_{AB}$, the constraint investigating part 105 calculates values for $S_{AB}(1)$, $S_{AB}(2)$ which does not contradict the formulas 17 to 18 and the formula 26, and when the values for $S_{AB}(1)$, $S_{AB}(2)$ exist (are calculated out), it is determined that there is no contradiction at the present point between the constraint conditions, so that the solution search processing 104 searches a solution for a value for subsequent $P_B(3)$.

Here, the values for $S_{AB}(1)$, $S_{AB}(2)$ exist which satisfy the constraint conditions of the formulas 17 to 18 and the formula 26 such as "$S_{AB}(1)=1, S_{AB}(2)=2$" or "$S_{AB}(1)=2, S_{AB}(2)=3$". In addition, as to the constraint condition on $S_{BC}$, since there is no constraint condition (2) on $S_{BC}$, a contradiction between constraint conditions cannot exist, so that the solution search processing part 104 continues to select a value for $P_B(3)$ (in the case hereof, $P_B(3)=1$) (step S410, step S411). Then, the constraint condition deriving part 103 similarly derives a constraint condition (2), while the constraint investigating part 105 similarly judges presence of a contradiction between the constraint conditions.

In this case, in the course of the constraint investigation upon the search on $P_B(3)$, no contradiction is derived between the constraint conditions, but upon the search on $P_B(4)$, a contraction between the constraint conditions is derived.

Here, searched is $P_B(4)=1$, so that the constraint investigating part 105 derives a constraint condition (2) on $S_{AB}$ as shown below, based on the partial solution candidate searched by the solution search processing part 104 ($P_B(1)=P_B(2) P_B(3)=P_B(4)=1$), the initial condition on the location C and the formula 47 (step S403).

$S_{AB}(1)<S_{AB}(3)$ (formula 33) (derived from the formulas 24 and 47)

$S_{AB}(1)<S_{AB}(2)$ (formula 34) (derived from the formulas 23 and 47)

$S_{AB}(1)<S_{AB}(4)$ (formula 35) (derived from the formulas 21 and 47)

$S_{AB}(3)<S_{AB}(2)$ (formula 36) (derived from the formulas 22 and 47)

$S_{AB}(3)<S_{AB}(4)$ (formula 37) (derived from the formulas 20 and 47)

$S_{AB}(2)<S_{AB}(4)$ (formula 38) (derived from the formulas 19 and 47)

Similarly, the constraint condition deriving part 103 derives a constraint condition (2) on $S_{BC}$, based on the partial solution candidate selected by the solution search processing part 104 ($P_B(1)=P_B(2)=P_B(3)=P_B(4)=1$), the initial condition on the location A and the formula 48 (step S404).

$S_{BC}(3)<S_{BC}(1)$ (formula 41) (derived from the formulas 18 and 48)

$S_{BC}(2)<S_{BC}(4)$ (formula 42) (derived from the formulas 17 and 48)

Subsequently, the constraint investigating part 105 judges if there is any contradiction between the constraint condition (1) on $S_{AB}$ (formulas 17 to 18) and the constraint condition (2) on $S_{AB}$ (formulas 33 to 38), and between the constraint condition (1) on $S_{BC}$ (formulas 19 to 24) and the constraint condition (2) on $S_{BC}$ (formulas 41 to 42) (step S407).

In this case, since contradicting constraint conditions on $S_{AB}$ exist such as the formula 17 and the formula 38, the constraint investigating part 105 cannot calculate values for $S_{AB}(1)$, $S_{AB}(2)$, $S_{AB}(3)$, and $S_{AB}(4)$ which do not contradict the constraint conditions (1), (2), and detects a contradiction between the constraint conditions (1) and (2) on $S_{AB}$. With the contradiction being detected, the solution search processing part 104 backtracks, and selects a partial solution candidate for $P_B(4)=2$ (step S408, step S409). That is to say, the partial solution candidate selected by the solution search processing part 104 here is: $P_B(1)=P_B(2)=P_B(3)=1$, $P_B(4)=2$.

Subsequently, the constraint condition deriving part 103 similarly derives a constraint condition (2) on the partial solution candidate $P_B(1)=P_B(2)=P_B(3)=1$, $P_B(4)=2$, while the constraint investigating part 105 judges presence of a contradiction between the constraint conditions similarly. Since a contradiction as aforementioned is not detected for this partial solution candidate (i.e., values to be taken exist for all of $S_{AB}(1)$ to $S_{AB}(4)$, $S_{BC}(1)$ to $S_{BC}(4)$), the solution search processing part 104 retains this partial solution candidate ($P_B(1)$ to $P_B(4)$) as a partial solution (step S412).

In addition, the solution search processing part 104 generates a solution by allocating values to $S_{AB}(1)$ to $S_{AB}(4)$, $S_{BC}(1)$ to $S_{BC}(4)$ in a manner of not contradicting the above constraint condition (1) and constraint condition (2), and retains the solution (step S413).

Hereinafter, the computation processing of values for $S_{AB}$ and $S_{BC}$ is specifically explained. In the present embodiment, the values for $S_{AB}$ and $S_{BC}$ for each object 1 to 4 are determined so as not to contradict the constraint conditions obtained on $S_{AB}$ and $S_{BC}$. That is to say, among plural constraint conditions $S_{AB}(i)<S_{AB}(j)$, $S_{BC}(i)<S_{BC}(j)$, the values for $S_{AB}$ and $S_{BC}$ are determined simply in order from the top of the list.

The constraint condition (2) on $S_{AB}$ obtained by the processing of the step S403 for the partial solution candidate $P_B(1)=P_B(2)=P_B(3)=1$, $P_B(4)=2$, is:

$S_{AB}(1)<S_{AB}(3)$ (formula 43)

$S_{AB}(1)<S_{AB}(2)$ (formula 44)

$S_{AB}(3)<S_{AB}(2)$ (formula 45)

In addition, the constraint condition (2) on $S_{BC}$ obtained by the processing of the step S403 for the same partial solution candidate is:

$S_{BC}(3)<S_{BC}(1)$ (formula 46)

Accordingly, the constraint condition on $S_{AB}$ as the formulas 17 to 18 and the constraint condition as the formulas 43 to 45 are listed as follows:

$S_{AB}(4)<S_{AB}(2)$ (formula 17)

$S_{AB}(1)<S_{AB}(3)$ (formula 18(formula 43))

$S_{AB}(1)<S_{AB}(2)$ (formula 44)

$S_{AB}(3)<S_{AB}(2)$ (formula 45)

In this case, transshippable from A to B first is one not presented on the right-hand side of each constraint condition, namely, the object 1 or object 4. Here, the object 1 is made to be the first transshipping target.

Subsequently, the solution search processing part 104 selects one not presented on the right-hand side of the formula, among those from which the constraint condition on the object 1 is eliminated. Accordingly, the formulas 18 and 44 are eliminated, so that one transshippable second is the object 3 or object 4. Here, the object 3 is assumed to be transshipped second. Then, only the formula 17 remains, so that one to be transshipped next is the object 4. As a result, the transshipping order from the location A to the location B is: object 1, object 3, object 4, and object 2.

Similarly, the constraint condition obtained on $S_{BC}$ is:

$S_{BC}(4)<S_{BC}(2)$ (formula 19)

$S_{BC}(4)<S_{BC}(3)$ (formula 20)

$S_{BC}(4)<S_{BC}(1)$ (formula 21)

$S_{BC}(2)<S_{BC}(3)$ (formula 22)

$S_{BC}(2)<S_{BC}(1)$ (formula 23)

$S_{BC}(3)<S_{BC}(1)$ (formula 24 (formula 46))

Here, transshippable first is one not presented on the right-hand side of each constraint condition, namely, the object 4.

Subsequently, the constraint satisfaction solution investigating part 105 selects one not presented on the right-hand side of the formula among those from which the constraint condition on the object 4 is eliminated. Accordingly, the formulas 19 to 21 are eliminated, so that one transshippable second is the object 2. Thus, only the formula 24 (formula 46) remains so that one transshippable subsequently is the object 3. As a result, the transshipping order from the location B to the location C is: object 4, object 2, object 3, and object 1.

As described above, the transferring order from the location A to the location B ($S_{AB}$) is: object 1, object 3, object 4, and object 2, that is to say, $S_{AB}(1)=1$, $S_{AB}(2)=4$, $S_{AB}(3)=2$, $S_{AB}(4)=3$, while the transferring order from the location B to the location C ($S_{BC}$) is: object 4, object 2, object 3, object 1, that is to say, $S_{BC}(1)=4, S_{BC}(2)=2, S_{BC}(3)=3, S_{BC}(4)=1$. Subsequently, the solution search processing part 104 determines $H_B$ based on the value for $S_{AB}$ and $S_{BC}$ and the value for $P_B$ for each object 1 to 4 (step S414). That is to say, $H_B$ is determined by the $P_B$ value mentioned above ($P_B(1)=P_B(2)=P_B(3)=1$, $P_B(4)=2$), and one or both of $S_{AB}$ and $S_{BC}$, as follows: $H_B(1)=1, H_B(2)=3, H_B(3)=2, H_B(4)=1$ Subsequently, the following computation result is outputted using an outputting device such as a display panel (step S415).

$P_B$ ($P_B(1)=P_B(2)=P_B(3)=1, P_B(4)=2$)
$S_{AB}$ ($S_{AB}(1)=1, S_{AB}(2)=4, S_{AB}(3)=2, S_{AB}(4)=3$)
$S_{BC}$ ($S_{BC}(1)=4, S_{BC}(2)=2, S_{BC}(3)=3, S_{BC}(4)=1$)
$H_B$ ($H_B(1)=1, H_B(2)=3, H_B(3)=2, H_B(4)=1$)

As a result, a user can know, from the output result, the transshipping method which enables the object loaded in the location A to be loaded in a desired state in the location C.

Further, when presence of a contradiction is determined at the step S407, and non-presence of a partial solution candidate that is not searched yet is determined (step S408), it is notified to the user that a partial solution candidate satisfying the constraint condition, in other words, a partial solution, does not exist (step S415).

In the present embodiment, when one partial solution candidate satisfying the constraint condition, in other words, a partial solution, is detected, $S_{AB}, S_{BC}, H_B$ which are calculated based on the partial solution and the pertinent partial solution are displayed on a display panel, and the process is terminated. However, as another embodiment, it is possible that: all the partial solution candidates satisfying the constraint condition, which are partial solutions, are searched; $S_{AB}, S_{BC}, H_B$ are respectively calculated based on each partial solution; $P_B, S_{AB}, S_{BC}, H_B$ corresponding to each partial solution are displayed on the display panel; and thereafter the process is terminated.

It is noted that the procedure for the process of the step S403 and the process of the step S404 in FIG. 4 are not limited to the above-described one, so that the process of the step S404 may be performed on ahead.

Comparative Example

Next, another modeling example for constraint satisfaction problem conceived by the inventor will be explained. In order to compare with the above-described embodiment, this comparative example refers to the modeling example of the constraint satisfaction problem in FIG. 1.

The point of difference between the present comparative example and the above-described embodiment is in the way of taking a variable to which a value is allocated. In the above-described embodiment, variables are prepared which take as values the heap number in the location B for each object 1 to 4, and solution search processing is performed in a manner that values are allocated to these variables. On the other hand, in the comparative example, the number of times that objects are transferred from the location A to the location B is identical to the number of the objects, which is four, or from a first time to a fourth time. For each transferring time, variables are prepared which have as values a combination of the heap number in the location A and the heap number in the location B, and these variables are targets to which values are allocated. Further, in the comparative example, the transferring order of objects can be identified from the values allocated to the variables.

Figure 6:
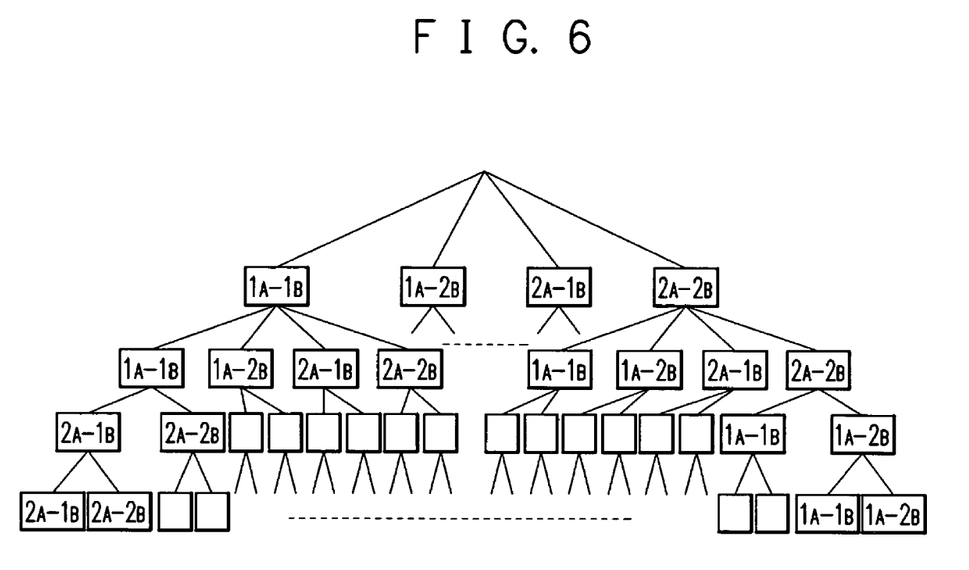
FIG. 6 is a schematic view of a solution space of a comparative example.

A solution space of the comparative example is schematically shown by the search tree in FIG. 6. A combination of branches of the search tree becomes a solution indicating transshipping steps based on the transshipping order of each object 1 to 4 from the location A to the location B, and the steps are performed sequentially starting from one indicated by a variable belonging to an advance level of the solution search (upper level of the search). This means that the solution space of the comparative example corresponds to a case of which actual transferring procedures of each object are simulated.

A specific explanation on the transshipping method shown by a combination of variables in the search tree will be hereinafter given, focusing on the leftmost portion of the pertinent search tree.

Figure 7:
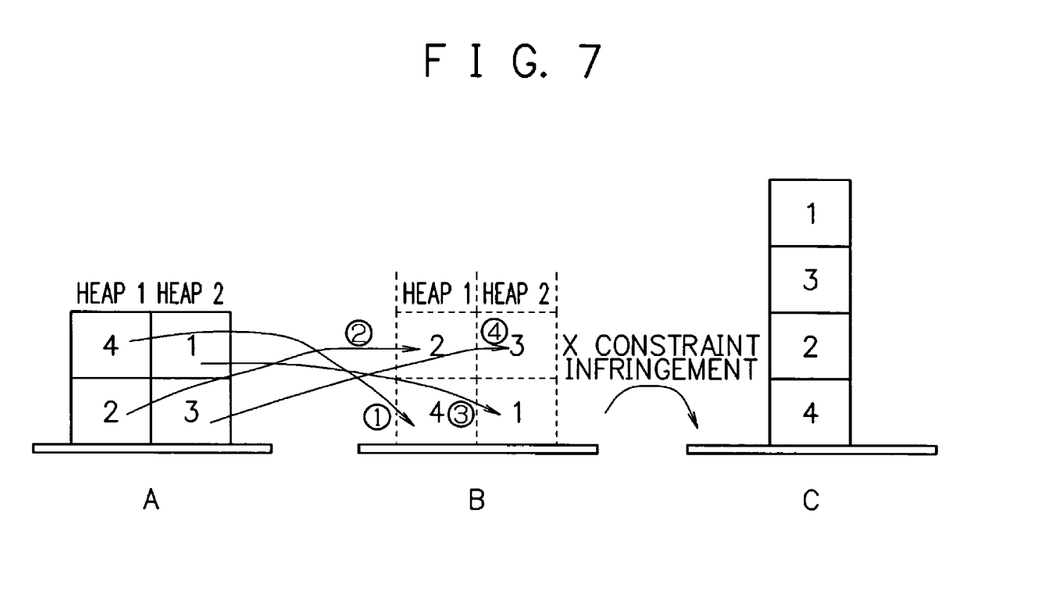
FIG. 7 is an explanatory view of a modeling of the constraint satisfaction problem of a comparative example.

The following explanation cites a solution candidate of "$1_A-1_B$", "$1_A-1_B$", "$2_A-2_B$", "$2_A-2_B$". This indicates, as shown in FIG. 7, that: upon the first transfer, an object 4 loaded on a heap 1 in a location A is transshipped to a heap 1 in a location B ("$1_A-1_B$"); upon the second transfer, an object 2 loaded on the heap 1 in the location A is transshipped to the heap 1 in the location B ("$1_A-1_B$"); upon the third transfer, an object 1 loaded on a heap 2 in the location A is transshipped to a heap 2 in the location B ("$2_A-2_B$"); and upon the fourth transfer, an object 3 loaded on the heap 2 in the location A is transshipped to the heap 2 in the location B ("$2_A-2_B$")

A solution search processing in the comparative example is performed in the same manner as in the above-described embodiment, in which it is judged whether each of the solution candidates searched satisfies a predetermined constraint condition, and if a constraint satisfaction solution which satisfies the constraint condition is detected, the processing is terminated. It should be noted that the constraint condition of the comparative example is different from the constraint condition of the above-described embodiment. This is because of the difference of the modeling method of the solution space as described above, and in the comparative example, a constraint satisfaction solution which can be regarded as a desired loading state at a location C is obtained by detecting a solution candidate satisfying the constraint condition viewed from the location C to the location B.

Next, the constraint condition of the comparative example is specifically explained with reference to the object 1 and object 3 as examples. In the example of FIG. 1, the object 2 is loaded on an upper level compared to the object 4 in the location C ($H_C(2)>H_C(4)$). To actualize that loading state, it is conditioned that at least the object 2 and object 4 are loaded on different heaps in the location B ($P_B(2) \neq P_B(4)$) or are loaded on the same heap with the object 4 being loaded on an upper level compared to the object 2 ($P_B(2)=P_B(4)$ and $H_B(4)>H_B(2)$). Accordingly, the solution candidate "$1_A-1_B$", "$1_A-1_B$", "$2_A-2_B$", "$2_A-2_B$" shown in FIG. 7 is detected as infringing the constraints.

By applying appropriate constraint conditions respectively to any two objects i, j, a solution candidate at a time the entire constraint condition is satisfied is detected as a constraint satisfying solution. Consequently, a constraint satisfying solution can be obtained which actualizes the loading state indicated by $H_C(1)=4, H_C(2)=2, H_C(3)=3, H_C(4)=1$ in the location C.

Here, to further examine the solution space for the above-described embodiment and for the comparative example, the solution space for the above-described embodiment consists of a set of combinations of allocating methods of values to the variables indicating which heap among the heaps 1, 2 in the location B each object 1 to 4 loaded in the location A is transshipped to, meaning that solution candidates of $2^4=16$ patterns exist in the solution space thereof.

On the other hand, the solution space for the comparative example is a set of solution candidates which can specify in what order the objects 1 to 4 are shipped from the heap 1 or 2 in the location A, and which heap in the location B the objects 1 to 4 being shipped are loaded on. Accordingly, solution candidates of $2^4 \times {}_4C_2=96$ patterns exist in the solution space thereof. Hence, the solution space for the above-described embodiment is considerably narrower than that for the comparative example. As the number of objects for transshipping or the number of heaps in the location A increases, the size difference between the solution spaces of the above-described embodiment and the comparative example widens exponentially, and such trend becomes increasingly significant.

As is clear with the above explanation, the present embodiment can make the size of the solution space for the solution search processing significantly smaller, which further leads to a shorter time required for the solution search processing, enabling an enhancement of its practicability.

Further, in many cases, each object to be transferred ("object") has physical properties such as size, length, weight, and so forth, according to which the number of objects transferable at one time by transferring means such as a crane or a forklift varies. Based on such a constraint by the equipment, the "object" in the above description on the embodiment does not necessarily indicate a singular object, so that all or a part of the above-described "object" may be handled as a set of objects in units loadable at one time or in units conveyable at one time by a transfer means.

According to the present invention, each object has a variable which takes as a value the identification number of a heap formed of a plurality of objects loaded thereon in a predetermined location, and solution search is performed by allocating values to these variables, such that the size of the solution space is significantly reduced compared to a prior one formed of a set of solution candidates simulating the transferring orders of objects, consequently allowing a solution search processing time which is considerably shorter and enhancement of the practical utility value of the processing.

The present embodiment is to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. A data processing unit, comprising:
a solution search processor to perform solution search processing of a plurality of physical objects in which the plurality of physical objects are transferred from a transfer origin to a transferring destination via a predetermined location and in which each object has a loading state signified by a data representation comprising a heap number variable of the object loaded in a predetermined physical location and a coordinate value indicating a loading order of the object in the heap, and
an initial condition inputter to input as an initial condition a heap number variable, a transfer order variable, and an identification data for each of the plurality of physical objects, wherein the heap number variable is either the number of the heaps formable in the predetermined location or an identification data for each of the heaps formable in the predetermined location, and the transfer order variable is a coordinate value indicating a loading order of each of the physical objects in the heaps; and
a constraint condition deriver that derives first constraint conditions on transferring order of the plurality of physical objects from the transfer origin to the predetermined location based on the initial condition, and first constraint conditions on transferring order of the plurality of physical objects from the predetermined location to the transferring destination based on the initial condition,
wherein said solution search processor performs the solution search processing based on the initial condition inputted by said initial condition inputter by:
determining partial solution candidates by allocating values to the heap number variables based on identification data for each of the plurality of physical objects and the number of heaps at the predetermined location,
the constraint condition deriver deriving second constraint conditions on a transferring order of each of the objects from the transfer origin to the predetermined location and second constraint conditions on a transferring order of each of the objects from the predetermined location to the transferring destination, based on the partial solution candidate generated by said solution search processor,
a constraint investigator judging whether a partial solution candidate generated by said solution search processor satisfies the first and second constraint conditions,
an outputter, outputting a partial solution when the partial solution candidate satisfies the first and second constraint conditions, and
said solution search processor continuing the solution search when the partial solution candidate does not satisfy the first and second constraint conditions.

2. The data processing unit according to claim 1, wherein said constraint investigator judges presence of a contradiction between the first constraint conditions on the transferring order of each of the objects from the transfer origin to the predetermined location and the second constraint conditions on the transferring order of each of the objects from the transfer origin to the predetermined location, as well as between the first constraint conditions on the transferring order of each of the objects from the predetermined location to the transferring destination and the second constraint conditions on the transferring order of each of the objects from the predetermined location to the transferring destination, respectively.

3. The data processing unit according to claim 2, wherein said solution search processor determines the coordinate value indicating the loading order of each of the objects in the predetermined location, based on both or one of the transferring order of each of the objects from the transfer origin to the predetermined location and the transferring order of each of the objects from the predetermined location to the transferring destination, and the partial solution.

4. The data processing unit according to claim 1, wherein a part or all of objects among the plural objects are a set of objects whose quantity is in units transferable at one time which is defined based on a constraint by equipment.

5. The data processing unit according to claim 1, wherein a part or all of the objects among the plural objects are a set of objects whose quantity is in units loadable at one time which is defined based on the constraint by equipment.

6. A data processing unit, comprising:
a solution search processor to perform solution search processing of a plurality of physical objects in which the plurality of physical objects are transferred from a transfer origin to a transferring destination via a predetermined location and in which each object has a loading state signified by a data representation comprising a heap number variable of the object loaded in a predetermined physical location and a coordinate value indicating a loading order of the object in the heap, and an initial condition inputter to input as an initial condition a heap number variable, a transfer order variable, and an identification data for each of the plurality of physical objects, wherein the heap number variable is either the number of the heaps formable in the predetermined location or an identification data for each of the heaps formable in the predetermined location, and the transfer order variable is a coordinate value indicating a loading order of each of the physical objects in the heaps, and wherein said initial condition inputter further accepts, as an initial condition, first constraint conditions on a transferring order of the plurality of physical objects from a transfer origin to the predetermined location, and first constraint conditions on a transferring order of the plurality of physical objects from the predetermined location to a transferring destination, and wherein said solution search processor performs the solution search processing based on the initial condition inputted by said initial condition inputter by:

determining partial solution candidates by allocating values to the heap number variables based on identification data for each of the plurality of physical objects and the number of heaps at the predetermined location, the constraint condition deriver deriving second constraint conditions on a transferring order of each of the objects from the transfer origin to the predetermined location and second constraint conditions on a transferring order of each of the objects from the predetermined location to the transferring destination, based on the partial solution candidate generated by said solution search processor, a constraint investigator judging whether a partial solution candidate generated by said solution search processor satisfies the first and second constraint conditions, an outputter, outputting a partial solution when the partial solution candidate satisfies the first and second constraint conditions, and said solution search processor continuing the solution search when the partial solution candidate does not satisfy the first and second constraint conditions.

7. A method for using a data processing unit, comprising:

performing, using the data processing unit, a solution search processing of a plurality of physical objects in which the plurality of physical objects are transferred from a transfer origin to a transferring destination via a predetermined location, in which each object has a loading state signified by a data representation comprising a heap number variable of the object loaded in a predetermined physical location and a coordinate value indicating a loading order of the object in the heap, the method comprising:

inputting, through an initial condition inputter, as an initial condition a heap number variable, a transfer order variable, and an identification data for each of the plurality of physical objects, wherein the heap number variable is either the number of the heaps formable in the predetermined location or an identification data for each of the heaps formable in the predetermined location, and the transfer order variable is a coordinate value indicating a loading order of each of the physical objects in the heaps;

deriving, using the data processing unit, first constraint conditions on transferring order of the plurality of physical objects from the transfer origin to the predetermined location based on the initial condition, and first constraint conditions on transferring order of the plurality of physical objects from the predetermined location to the transferring destination based on the initial condition;

performing the solution search processing based on the initial condition inputted by said initial condition inputter by:

determining partial solution candidates by allocating values to the heap number variables based on identification data for each of the plurality of physical objects and the number of heaps at the predetermined location, deriving second constraint conditions on a transferring order of each of the objects from the transfer origin to the predetermined location and second constraint conditions on a transferring order of each of the objects from the predetermined location to the transferring destination, based on the partial solution candidate generated by said solution search processor, and judging whether a partial solution candidate generated by said solution search processor satisfies the first and second constraint conditions, and continuing the solution search when the partial solution candidate does not satisfy the first and second constraint conditions; and outputting a partial solution when the partial solution candidate satisfies the first and second constraint conditions.

8. A non-transitory computer readable medium storing therein a program of instructions executable by a computer to perform solution search processing of a plurality of physical objects in which the plurality of physical objects are transferred from a transfer origin to a transferring destination via a predetermined location, in which each object has a loading state signified by a data representation comprising a heap number variable of the object loaded in a predetermined physical location a coordinate value indicating a loading order of the object in the heap, and inputting, through an initial condition inputter, as an initial condition a heap number variable, a transfer order variable, and an identification data for each of the plurality of physical objects, wherein the heap number variable is either the number of the heaps formable in the predetermined location or an identification data for each of the heaps formable in the predetermined location, and the transfer order variable is a coordinate value indicating a loading order of each of the physical objects in the heaps;

deriving first constraint conditions on transferring order of the plurality of physical objects from the transfer origin to the predetermined location, and first constraint conditions on transferring order of the plurality of physical objects from the predetermined location to the transferring destination based on the initial condition;

performing the solution search processing based on the initial condition inputted by said initial condition inputter by:

determining partial solution candidates by allocating values to the heap number variables based on identification data for each of the plurality of physical objects and the number of heaps at the predetermined location, deriving second constraint conditions on a transferring order of each of the objects from the transfer origin to the predetermined location and second constraint conditions on a transferring order of each of the objects from the predetermined location to the transferring destination, based on the partial solution candidate generated by said solution search processor, and judging whether a partial solution candidate generated by said solution search processor satisfies the first and second constraint conditions, and continuing the solution search when the partial solution candidate does not satisfy the first and second constraint conditions; and outputting a partial solution when the partial solution candidate satisfies the first and second constraint conditions.

9. A method for using a data processing unit, comprising:

performing, using the data processing unit, a solution search processing of a plurality of physical objects where the plurality of physical objects are transferred from a transfer origin to a transferring destination via a predetermined location, in which each objection has a loading state signified by a data representation comprising a heap number variable of the object loaded in a predetermined physical location and a coordinate value indicating a loading order of the object in the heap, the method comprising:

inputting, through an initial condition inputter, as an initial condition a heap number variable, a transfer order variable, and an identification data for each of the plurality of physical objects, wherein the heap number variable is either the number of the heaps formable in the predetermined location or an identification data for each of the heaps formable in the predetermined location, and wherein the transfer order variable is a coordinate value indicating a loading order of each of the physical objects in the heaps;

wherein said initial condition inputter further accepts, as the initial condition, first constraint conditions on a transferring order of the plurality physical objects from a transfer origin to the predetermined location, and first constraint conditions on a transferring order of the plurality physical objects from the predetermined location to a transferring destination;

performing the solution search processing based on the initial condition inputted by said initial condition inputter by:

determining partial solution candidates by allocating values to the heap number variables based on identification data for each of the plurality of physical objects and the number of heaps at the predetermined location, deriving second constraint conditions on a transferring order of each of the objects from the transfer origin to the predetermined location and second constraint conditions on a transferring order of each of the objects from the predetermined location to the transferring destination, based on the partial solution candidate generated by said solution search processor, and judging whether a partial solution candidate generated by said solution search processor satisfies the first and second constraint conditions, and continuing the solution search when the partial solution candidate does not satisfy the first and second constraint conditions, wherein the first constraint conditions that specify that, when a plurality of physical objects are loaded on a same heap in a transfer origin, a first physical object of the heap on an upper level has to be moved ahead of a second physical object located under the first physical object in being moved out to the predetermined location, and the second constraint conditions that specify that, when a plurality of physical objects are loaded on a same heap in a transferring destination, a first physical object of the heap to be loaded on a lower level has to be moved ahead of a second physical object to be loaded above the first physical object in being moved to the transferring destination from a predetermined location; and outputting a partial solution when the partial solution candidate satisfies the first and second constraint conditions.

* * * * *